(12) United States Patent
Tatekawa et al.

(10) Patent No.: US 12,472,923 B2
(45) Date of Patent: Nov. 18, 2025

(54) HYBRID ALL-WHEEL-DRIVE VEHICLE

(71) Applicant: SUBARU CORPORATION, Tokyo (JP)

(72) Inventors: Hiroshi Tatekawa, Tokyo (JP); Akihiro Nabeshima, Tokyo (JP); Norio Oowada, Tokyo (JP); Takeshi Yoneda, Tokyo (JP); Masaki Takami, Tokyo (JP); Katsuya Higuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 328 days.

(21) Appl. No.: 17/840,087

(22) Filed: Jun. 14, 2022

(65) Prior Publication Data

US 2023/0011741 A1   Jan. 12, 2023

(30) Foreign Application Priority Data

Jul. 7, 2021   (JP) .................................. 2021-113098

(51) Int. Cl.
*B60W 20/10* (2016.01)
*B60K 6/26* (2007.10)
(Continued)

(52) U.S. Cl.
CPC .............. *B60W 20/10* (2013.01); *B60K 6/26* (2013.01); *B60K 6/365* (2013.01); *B60K 6/387* (2013.01);
(Continued)

(58) Field of Classification Search
CPC . B60K 6/26; B60K 6/52; B60K 6/365; B60K 6/387; B60W 10/02; B60W 10/06;
(Continued)

(56) References Cited

U.S. PATENT DOCUMENTS

2002/0094908 A1* 7/2002 Urasawa ................. B60K 6/38
903/905
2004/0070270 A1* 4/2004 Gunji ....................... B60L 7/10
903/917
(Continued)

FOREIGN PATENT DOCUMENTS

JP   2004166383 A * 6/2004
JP   2006044549 A * 2/2006
(Continued)

*Primary Examiner* — Redhwan K Mawari
(74) *Attorney, Agent, or Firm* — McGinn I.P. Law Group, PLLC

(57) ABSTRACT

A hybrid all-wheel-drive vehicle includes an engine, first and second motor generators, a first clutch between the second motor generator and a front wheel, a second clutch between the second motor generator and a rear wheel, and a control unit that controls, based on a vehicle traveling state, the engine, the motor generators, and the clutches. The first motor generator is coupled to the engine and the front wheel in a manner capable of transmitting torque. During regeneration, the control unit engages the first clutch and disengages the second clutch. When the all-wheel-drive vehicle shifts from motor traveling to hybrid traveling, the control unit restarts the engine by operating the first motor generator and regulates engagement forces of the clutches and output torque of the second motor generator to compensate driving torque of the front wheel by the second motor generator while maintaining driving torque of the rear wheel.

19 Claims, 9 Drawing Sheets

(51) Int. Cl.
  *B60K 6/365*    (2007.10)
  *B60K 6/387*    (2007.10)
  *B60K 6/52*     (2007.10)
  *B60W 10/02*    (2006.01)
  *B60W 10/06*    (2006.01)
  *B60W 10/08*    (2006.01)
  *B60W 10/119*   (2012.01)

(52) U.S. Cl.
  CPC ............... *B60K 6/52* (2013.01); *B60W 10/02* (2013.01); *B60W 10/06* (2013.01); *B60W 10/08* (2013.01); *B60W 10/119* (2013.01); *B60W 2520/105* (2013.01); *B60W 2520/125* (2013.01); *B60W 2530/10* (2013.01); *B60W 2552/40* (2020.02); *B60W 2720/403* (2013.01); *B60Y 2200/92* (2013.01); *B60Y 2400/82* (2013.01)

(58) Field of Classification Search
  CPC .... B60W 10/08; B60W 10/119; B60W 20/10; B60W 2520/105; B60W 2520/125; B60W 2530/10; B60W 2552/40; B60W 2720/403; B60Y 2200/82; B60Y 2200/92
  See application file for complete search history.

(56) References Cited

U.S. PATENT DOCUMENTS

| | | | |
|---|---|---|---|
| 2005/0099146 A1* | 5/2005 | Nishikawa | B60L 7/18 318/63 |
| 2010/0175944 A1* | 7/2010 | Hayashi | B60K 23/0808 180/242 |
| 2011/0276241 A1 | 11/2011 | Nakao | |
| 2014/0054100 A1* | 2/2014 | Boskovitch | B60K 6/52 180/242 |
| 2017/0305416 A1* | 10/2017 | Yamakado | B60T 7/12 |
| 2018/0178642 A1* | 6/2018 | Hata | B60K 6/445 |
| 2019/0276006 A1* | 9/2019 | Kasahara | B60W 20/30 |
| 2020/0207330 A1* | 7/2020 | Mizuno | B60K 6/48 |
| 2020/0298822 A1* | 9/2020 | Miyamoto | B60K 17/356 |
| 2022/0009476 A1* | 1/2022 | Cho | B60W 10/02 |
| 2022/0118966 A1* | 4/2022 | Kagaya | B60W 10/02 |
| 2024/0157932 A1* | 5/2024 | Tomoda | B60W 20/10 |

FOREIGN PATENT DOCUMENTS

| | | | |
|---|---|---|---|
| JP | 2007246056 A | * | 9/2007 |
| JP | 5310746 B2 | | 10/2013 |

\* cited by examiner

HYBRID ALL-WHEEL-DRIVE VEHICLE

CROSS-REFERENCE TO RELATED APPLICATIONS

The present application claims priority from Japanese Patent Application No. 2021-113098 filed on Jul. 7, 2021, the entire contents of which are hereby incorporated by reference.

BACKGROUND

The present disclosure relates to a hybrid all-wheel-drive vehicle and relates to, for example, a two-motor hybrid all-wheel-drive vehicle.

In recent years, a hybrid automobile (HEV) capable of improving the fuel consumption rate (fuel economy) of the vehicle by using an engine together with a motor generator (electric motor) has been put to practical use. Meanwhile, an all-wheel-drive (AWD) vehicle (or a four-wheel drive (4WD) vehicle) having an ability to travel on a steep road, a rough road, a slippery road (for example, a snowy road and a muddy road), and the like has been put to practical use.

There is a known three-motor hybrid all-wheel-drive system that includes a two-motor HEV system for driving front wheels and a motor for driving rear wheels in combination. However, regarding such a three-motor hybrid all-wheel-drive system, costs may be increased due to an increased number of components and a complex system, and fuel economy may be degraded due to increases in its weight and spin loss. Thus, to avoid the number of components from increasing and a system from becoming complex and suppress increases in the weight and the spin loss (in other words, to suppress a cost increase and degradation in fuel economy), it is desirable to provide a hybrid all-wheel-drive system capable of performing front-rear driving-force distribution by two motors.

As such a two-motor hybrid all-wheel-drive system, Japanese Patent No. 5310746 discloses a hybrid all-wheel-drive system including a differential mechanism and a differential limit clutch between a first electric motor MG1 that is coupled to front wheels in a manner to be capable of transmitting torque and a second electric motor MG2 that is coupled to rear wheels in a manner to be capable of transmitting torque.

SUMMARY

An aspect of the disclosure provides a hybrid all-wheel-drive vehicle. The hybrid all-wheel-drive vehicle includes an engine, a first motor generator, a second motor generator, a first clutch, a second clutch, and a control unit. The first clutch is interposed between the second motor generator and a front wheel of the hybrid all-wheel-drive vehicle. The second clutch is interposed between the second motor generator and a rear wheel of the hybrid all-wheel-drive vehicle. The control unit is configured to control, based on a traveling state of the vehicle, the engine, the first motor generator, the second motor generator, the first clutch, and the second clutch. The first motor generator is coupled to the engine in a manner capable of transmitting torque and is coupled to the front wheel in a manner capable of transmitting torque. The control unit is configured to, during regeneration, engage the first clutch and disengage the second clutch. When the hybrid all-wheel-drive vehicle shifts from motor traveling by the second motor generator to hybrid traveling by restarting the engine, the control unit is configured to restart the engine by operating the first motor generator and regulate an engagement force of each of the first clutch and the second clutch and regulate output torque of the second motor generator to compensate driving torque of the front wheel by the second motor generator while maintaining driving torque of the rear wheel.

An aspect of the disclosure provides a hybrid all-wheel-drive vehicle. The hybrid all-wheel-drive vehicle includes an engine, a first motor generator, a second motor generator, a first clutch, a second clutch, and circuitry. The first clutch is interposed between the second motor generator and a front wheel of the hybrid all-wheel-drive vehicle. The second clutch is interposed between the second motor generator and a rear wheel of the hybrid all-wheel-drive vehicle. The circuitry is configured to control, based on a traveling state of the vehicle, the engine, the first motor generator, the second motor generator, the first clutch, and the second clutch. The first motor generator is coupled to the engine in a manner capable of transmitting torque and is coupled to the front wheel in a manner capable of transmitting torque. The circuitry is configured to, during regeneration, engage the first clutch and disengage the second clutch. When the hybrid all-wheel-drive vehicle shifts from motor traveling by the second motor generator to hybrid traveling by restarting the engine, the circuitry is configured to restart the engine by operating the first motor generator and regulate an engagement force of each of the first clutch and the second clutch and regulate output torque of the second motor generator to compensate driving torque of the front wheel by the second motor generator while maintaining driving torque of the rear wheel.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
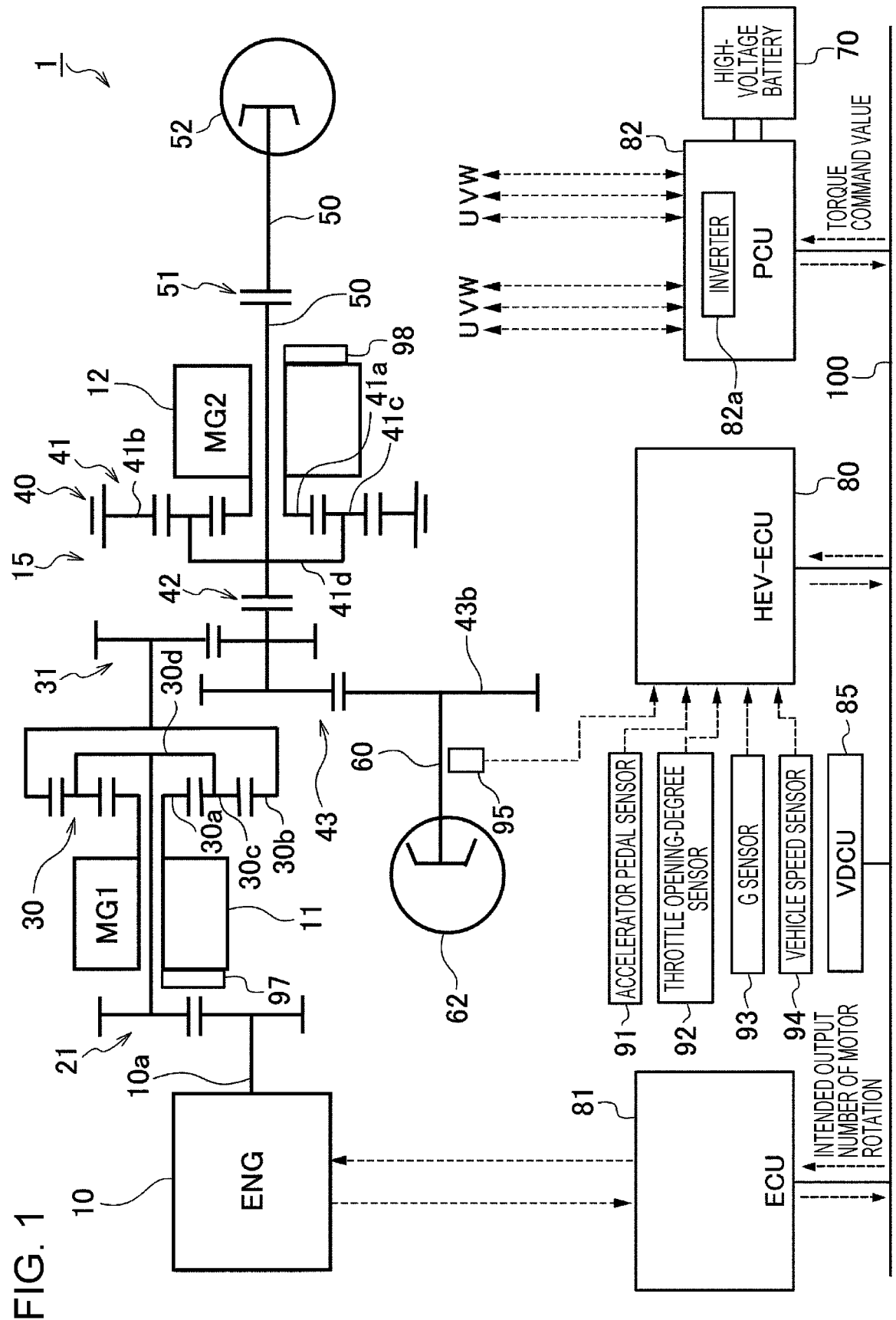
FIG. 1 is a skeleton diagram illustrating a configuration of a hybrid all-wheel-drive vehicle according to an embodiment of the disclosure, and a block diagram of a configuration of a control system thereof.

In the configuration of the two-motor hybrid all-wheel-drive system disclosed in Japanese Patent No. 5310746, regeneration from the front wheels, to which a load moves during braking, may be difficult and regeneration from the rear wheels may be performed because a spin due to the front wheels and the rear wheels being locked simultaneously may occur (in other words, because of restriction by differential limiting) when differential limiting is performed during braking. The amount of regeneration may be thus decreased (generally, the ratio of braking forces of the front wheels and the rear wheels is 7:3 to 8:2).

When the first electric motor MG1 attempts to increase the rotation of an engine to switch from motor traveling (EV traveling) by motor generators to hybrid traveling (HEV traveling) by the engine and the motor generators, in other words, to restart the engine by the first electric motor MG1, a decelerating force may be generated in the front and rear wheels due to a reactive force thereof. When the reactive force is attempted to be negated by an output by the second electric motor MG2, the driving force of the rear wheels may be increased, and front-rear driving distribution may be not balanced, which may result in unstable behavior of the vehicle (in other words, spin tendency of the vehicle), for example, during turning on a low-μ road. When differential limiting torque is applied to suppress imbalance of the front and rear driving forces, a tight corner braking phenomenon may occur, for example, during large-steering turning on a high-μ road. In other words, desirable front-rear driving-force distribution may be not achieved when switching from the EV traveling to the HEV traveling is performed by restarting the engine.

It is desirable to provide a two-motor hybrid all-wheel-drive vehicle that includes an engine and two motor generators and that is capable of performing regeneration with front wheels during deceleration and capable of achieving desirable front-rear driving-force distribution when shifting from EV traveling (motor traveling) by the motor generators to HEV traveling (hybrid traveling) by the engine and the motor generators by restarting the engine.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, with reference to FIG. 1, a configuration of a hybrid all-wheel-drive vehicle 1 according to the embodiment will be described. FIG. 1 is a skeleton diagram illustrating a configuration of the hybrid all-wheel-drive vehicle 1 and a block diagram of a configuration of a control system thereof.

A power splitting mechanism 30 is coupled to a crank shaft 10a of an engine 10 via a pair of gears 21. A drive train 15 that includes a plurality of gears, shafts, and the like and that transmits torque between the drive train 15 and driving wheels, and a first motor generator (MG) 11 are coupled to the power splitting mechanism 30. The power splitting mechanism 30 includes, for example, a planetary gear mechanism that includes a sun gear 30a, a ring gear 30b, a pinion gear 30c, and a carrier 30d. In one embodiment of the disclosure, the planetary gear mechanism may serve as a "first planetary gear mechanism". The power splitting mechanism is configured to split and transmit driving torque generated from the engine 10 to the drive train 15 and the first motor generator 11.

In one example, the carrier 30d is coupled to the crank shaft 10a of the engine 10 via the pair of gears 21. The sun gear 30a is coupled to the first motor generator 11. The ring gear 30b is coupled to a propeller shaft (rear-wheel output shaft) 50 constituting the drive train 15 via a pair of gears (counter gears) 31 and further coupled to a front drive shaft (front-wheel output shaft) 60 via a driving reduction gear 43.

When the first motor generator 11 serves as a generator (power generator), the power splitting mechanism 30 distributes torque (a driving force) from the engine 10, the torque being input from the carrier 30d, to the sun gear 30a and the ring gear 30b in accordance with the gear ratios thereof. When the first motor generator 11 serves as a motor (electric motor), the power splitting mechanism 30 integrates torque from the engine 10, the torque being input from the carrier 30d, and torque from the first motor generator 11, the torque being input from the sun gear 30a, and outputs the integrated torque to the ring gears 30b. The torque output to the ring gear 30b is output via the pair of gears (counter gears) 31 to the propeller shaft 50 constituting the drive train 15 and is further output to a front drive shaft 60 via the driving reduction gear 43. Thus, the first motor generator 11 is coupled to the engine 10 in a manner to be capable of transmitting torque and is coupled to front wheels 5FL and 5FR in a manner to be capable of transmitting torque. The engine 10 may be started and restarted by the driving torque of the first motor generator 11.

A second motor generator (MG) 12 is also coupled to the drive train 15. In one example, the second motor generator 12 is coupled to the propeller shaft 50 via a motor reduction gear 41. The second motor generator 12 is also coupled to the front drive shaft 60 via a driving reduction gear mechanism 40 including the motor reduction gear 41 and the driving reduction gear 43. The front drive shaft 60 transmits torque between the front drive shaft 60 and the front wheels 5FL and 5FR. The propeller shaft 50 transmits torque between the propeller shaft 50 and rear wheels 5RL and 5RR.

Between the motor reduction gear 41 and the driving reduction gear 43 (in other words, between the second motor generator 12 and the front wheels 5FL and 5FR), a first clutch 42 that regulates torque transmitted between the second motor generator 12 and the front wheels 5FL and 5FR is interposed. At the propeller shaft 50 (between the second motor generator 12 and the rear wheels 5RL and 5RR), a second clutch 51 that regulates torque transmitted between the second motor generator 12 and the rear wheels 5RL and 5RR is interposed.

The first motor generator 11 and the second motor generator 12 each serve as a synchronous generator motor that has a function as a motor that coverts supplied electric power into mechanical power and a function as a generator that converts input mechanical power into electric power. In other words, the first motor generator 11 and the second motor generator 12 each operate as a motor that generates driving torque during vehicle driving and operates as a generator during regeneration. The first motor generator 11 may basically operate as a generator, and the second motor generator 12 may basically operate as a motor.

The driving reduction gear mechanism 40 includes the motor reduction gear 41 and the driving reduction gear 43. The motor reduction gear 41 includes a planetary gear mechanism, and the reduction gear 43 includes, for example, a flat gear (or a helical gear).

In one example, the motor reduction gear 41 includes, for example, a planetary gear mechanism including a sun gear 41a, a ring gear 41b, a pinion gear 41c, and a carrier 41d. In one embodiment of the disclosure, the planetary gear mechanism may serve as a "second planetary gear mechanism". The sun gear 41a is coupled to a rotary shaft of the second motor generator 12 in a manner to be capable of transmitting torque. The carrier 41d is coupled to the first clutch 42 and the second clutch 51 in a manner to be capable of transmitting torque. When the second motor generator 12 serves as a motor, the motor reduction gear 41 decelerates rotation (increases torque) transmitted from the second motor generator 12 and outputs the rotation from the carrier 41d. The motor reduction gear 41 causes the second motor generator 12 to serve as a generator by accelerating (decreasing torque) the rotation by torque (a driving force) input to the carrier 41d and outputting the rotation from the sun gear 41a.

The front drive shaft 60 transmits torque between the driving reduction gear mechanism 40 and driving wheels (the front wheels 5FL and 5FR in the example in FIG. 1). In one example, torque of the engine 10, the second motor generator 12, and the like transmitted to the front drive shaft 60 is transmitted to a front differential (hereinafter may be also referred to as the "front diff") 62. The front diff 62 is, for example, a bevel-gear differential device. Torque from the front diff 62 is transmitted via a left-front-wheel drive shaft to the left front wheel 5FL and transmitted via a right-front-wheel drive shaft to the right front wheel 5FR.

The propeller shaft 50 transmits torque between the propeller shaft 50 and the rear wheels 5RL and 5RR. As described above, in the propeller shaft 50, the second clutch 51 that regulates torque that is to be transmitted to the rear wheels 5RL and 5RR is interposed. The engagement force (in other words, the rate of torque distribution to the rear wheels 5RL and 5RR) of the second clutch 51 is controlled in accordance with a drive state (for example, a slip state) of the four wheels, and the like. Thus, the torque of the second motor generator 12 and the like transmitted to the propeller shaft 50 is distributed in accordance with the engagement force of the second clutch 51 and distributed also to the rear wheels 5RL and 5RR.

In one example, the torque transmitted to the propeller shaft 50a and regulated by the second clutch 51 is transmitted to a rear differential gear (hereinafter may be also referred to as the "rear diff") 52. A left-rear-wheel drive shaft and a right-rear wheel drive shaft are coupled to the rear diff 52. The driving force from the rear diff 52 is transmitted via the left-rear-wheel drive shaft to the left rear wheel 5RL and transmitted via the right-rear-wheel drive shaft to the right rear wheel 5RR.

Due to the above configuration, the vehicle (AWD hybrid electric vehicle) according the embodiment may be able to drive the front wheels 5FL and 5FR and the rear wheels 5RL and 5RR (vehicle) by the power of the two of the engine 10 and the second motor generator 12. For example, traveling (EV traveling) by the second motor generator 12 and traveling (HEV traveling) by the engine 10 and the second motor generator 12 may be switchable in accordance with traveling conditions. Regeneration may be performed by the second motor generator 12 and the like.

The engine 10, the second motor generator 12, and the first motor generator 11, which are driving force sources of the vehicle, are comprehensively controlled by a HEV-CU 80. The HEV-CU 80 also controls the engagement forces (engage and disengage) of the first clutch 42 and the second clutch 51.

The HEV-CU 80 includes a microprocessor that performs an arithmetic operation, an EEPROM that stores a program and the like for causing the microprocessor to execute each processing, a RAM that stores various types of data, such as a result of an arithmetic operation, a backup RAM that holds stored contents, an input-output I/F, and the like.

Various types of sensors are coupled to the HEV-CU 80. The various types of sensors include, for example, an accelerator pedal sensor 91 that detects the amount of stepping on an accelerator pedal, a throttle opening-degree sensor 92 that detects the opening degree of a throttle valve, a G sensor (acceleration sensor) 93 that detects front-rear/left-right acceleration of the vehicle, a vehicle speed sensor 94 that detects the speed of the wheels, a rotation number sensor 95 that detects the number of rotations of the front drive shaft 60, a resolver 97 that detects the rotational position (the number of rotations) of the first motor generator 11, a resolver 98 that detects the rotational position (the number of rotations) of the second motor generator 12, a rotation number sensor that detects the number of rotations of the propeller shaft 50, and the like.

The HEV-CU 80 is coupled via a CAN (Controller Area Network) 100 to an ECU 81 that controls the engine 10, a vehicle dynamics control unit (hereinafter referred to as the "VDCU") 85 that improves traveling stability by suppressing skidding of the vehicle, and the like in a manner to be capable of communicating with each other. Via the CAN 100, the HEV-CU 80 receives various types of information on, for example, the number of rotations of the engine, the amount of braking operation, the steering angle of a steering wheel, the yaw rate, and the like from the ECU 81 and the VDCU 85.

On the basis of these various types of obtained information, the HEV-CU 80 comprehensively controls driving of the engine 10, the second motor generator 12, and the first motor generator 11 and switches a traveling mode of the two-motor hybrid all-wheel-drive vehicle 1 among an EV traveling (motor traveling) mode, a HEV traveling (hybrid traveling) mode, and a regeneration mode by driving the first clutch 42 and the second clutch 51. On the basis of, for example, an accelerator-pedal opening degree (a driving force intended by a driver), an operation state (for example, a vehicle speed, a steering angle, and the like) of the vehicle, a charged state (SOC) of a high-voltage battery 70, the BSFC of the engine 10, and the like, the HEV-CU 80 obtains and outputs an intended output of the engine 10 and torque command values of the second motor generator 12 and the first motor generator 11 and outputs a control signal (for example, a duty signal) that controls engagement forces (engage and disengage) of the first clutch 42 and the second clutch 51. In other words, the HEV-CU 80 may serve as a control unit in one embodiment of the disclosure.

On the basis of the aforementioned intended output, the ECU 81 regulates, for example, the opening degree of an electronically controlled throttle valve. On the basis of the aforementioned torque command values, a power control unit (hereinafter referred to as the "PCU") 82 drives the second motor generator 12 and the first motor generator 11 via an inverter 82a. The inverter 82a converts direct-current power of the high-voltage battery 70 into three-phase current and supplies the current to the second motor generator 12 and the first motor generator 11. The inverter 82a converts an alternating-current voltage generated by the second motor generator 12 and/or the first motor generator 11 during regeneration and the like into a direct-current voltage and charges the high-voltage battery 70.

In one example, the HEV-CU 80 may be able to perform regeneration with the front wheels 5FL and 5FR during deceleration and may have a function of achieving desirable front-rear driving-force distribution when shifting from the EV traveling (motor traveling) by the second motor generator 12 to the HEV traveling (hybrid traveling) by the engine 10 and the second motor generator 12 by restarting the engine 10. The HEV-CU 80 realizes the aforementioned function in response to the program stored in the EEPROM or the like being executed by the microprocessor.

(1) HEV Traveling (Hybrid Traveling) Mode

The HEV-CU 80 operates (drives) the engine 10, the first motor generator 11, and the second motor generator 12 in the HEV traveling (hybrid traveling) mode. At this time, the HEV-CU 80 regulates (controls) the engagement forces of the first clutch 42 and the second clutch 51, for example, to achieve desirable front-rear driving-force distribution in accordance with a margin of the frictional force of each of the front wheels 5FL and 5FR and the rear wheels 5RL and 5RR with respect to a road surface. For example, the HEV-CU 80 obtains the vertical loads of the front wheels 5FL and 5FR and the rear wheels 5RL and 5RR from the front-rear acceleration and the lateral acceleration of the vehicle and estimates the margin of the frictional force with respect to the road surface on the basis of the vertical loads.

Figure 2:
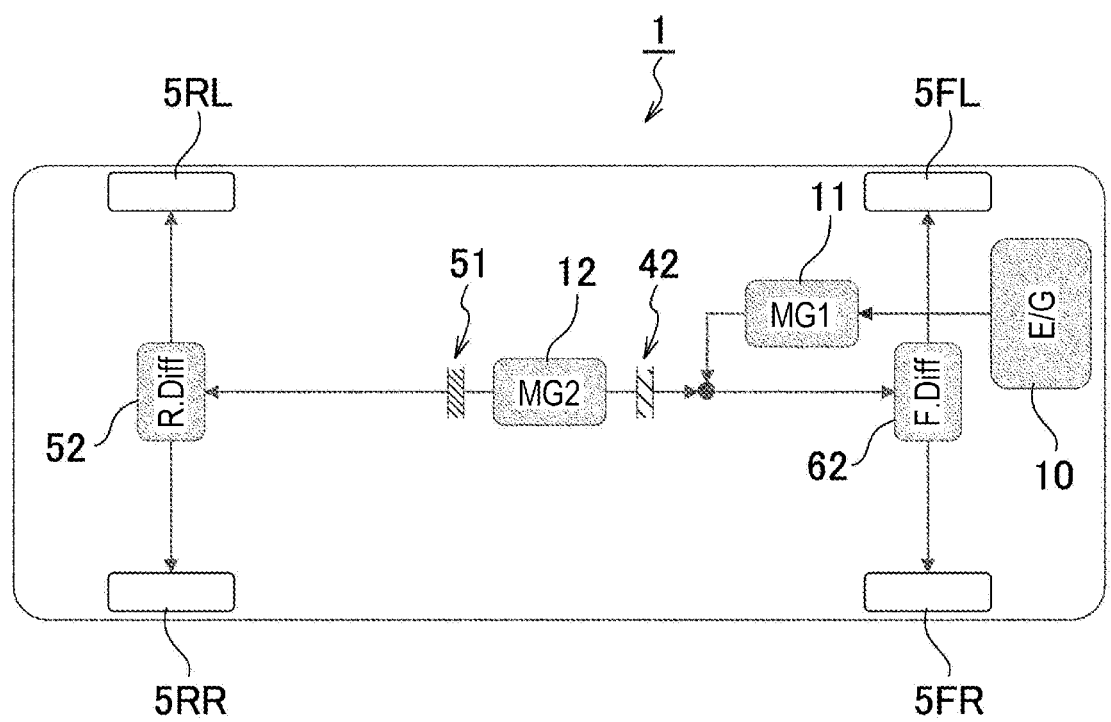
FIG. 2 is a diagram illustrating a torque transmission path (torque flow) in a HEV traveling mode.
Figure 3:
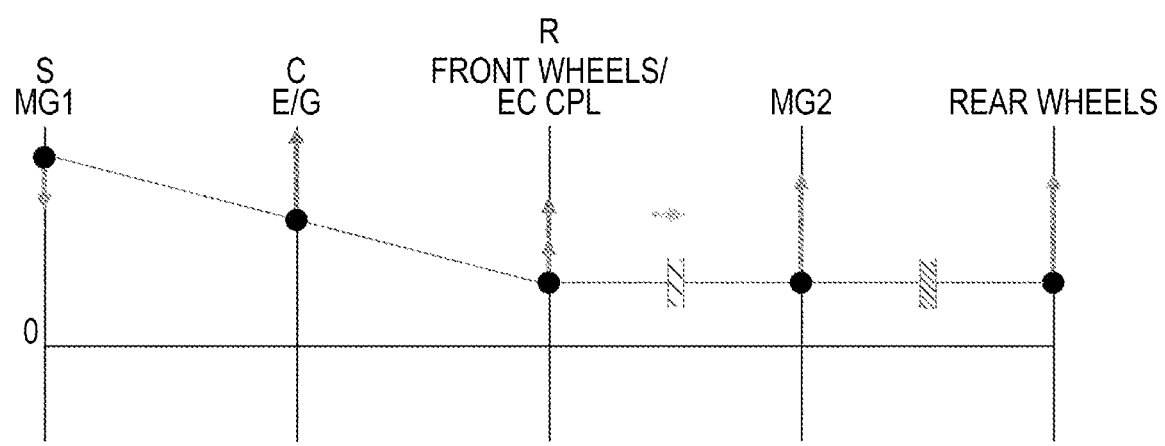
FIG. 3 is a collinear diagram (velocity diagram) illustrating rotational states (operational states) of a first motor generator, an engine, front wheels, a second motor generator, and rear wheels in the HEV traveling mode.

A torque transmission path (torque flow) in the HEV traveling mode is illustrated in FIG. 2. A collinear diagram (velocity diagram) illustrating rotational states (operational states) of the first motor generator 11, the engine 10, the front wheels 5FL and 5FR, the second motor generator 12, and the rear wheels 5RL and 5RR in the HEV traveling mode is illustrated in FIG. 3.

In the HEV traveling (hybrid traveling) mode, the torque of the engine 10 and the first motor generator 11 is transmitted to the front wheels 5FL and 5FR via the power splitting mechanism 30 and transmitted to the rear wheels 5RL and 5RR via the first clutch 42 and the second clutch 51. The torque of the second motor generator 12 is transmitted to the rear wheels 5RL and 5RR via the second clutch 51 and transmitted to the front wheels 5FL and 5FR via the first clutch 42.

(2) EV Traveling (Motor Traveling) Mode

In the EV traveling (motor traveling) mode, the HEV-CU 80 suspends (stops) the engine 10 and the first motor generator 11 and operates (drives) the second motor generator 12. At this time, the HEV-CU 80 regulates (controls) the engagement forces of the first clutch 42 and the second clutch 51, for example, to achieve desirable front-rear driving-force distribution in accordance with a margin of the frictional force of each of the front wheels 5FL and 5FR and the rear wheels 5RL and 5RR with respect to a road surface. For example, the HEV-CU 80 obtains the vertical loads of the front wheels 5FL and 5FR and the rear wheels 5RL and 5RR from the front-rear acceleration and the lateral acceleration of the vehicle and estimates the margin of the frictional force with respect to the road surface on the basis of the vertical loads.

Figure 4:
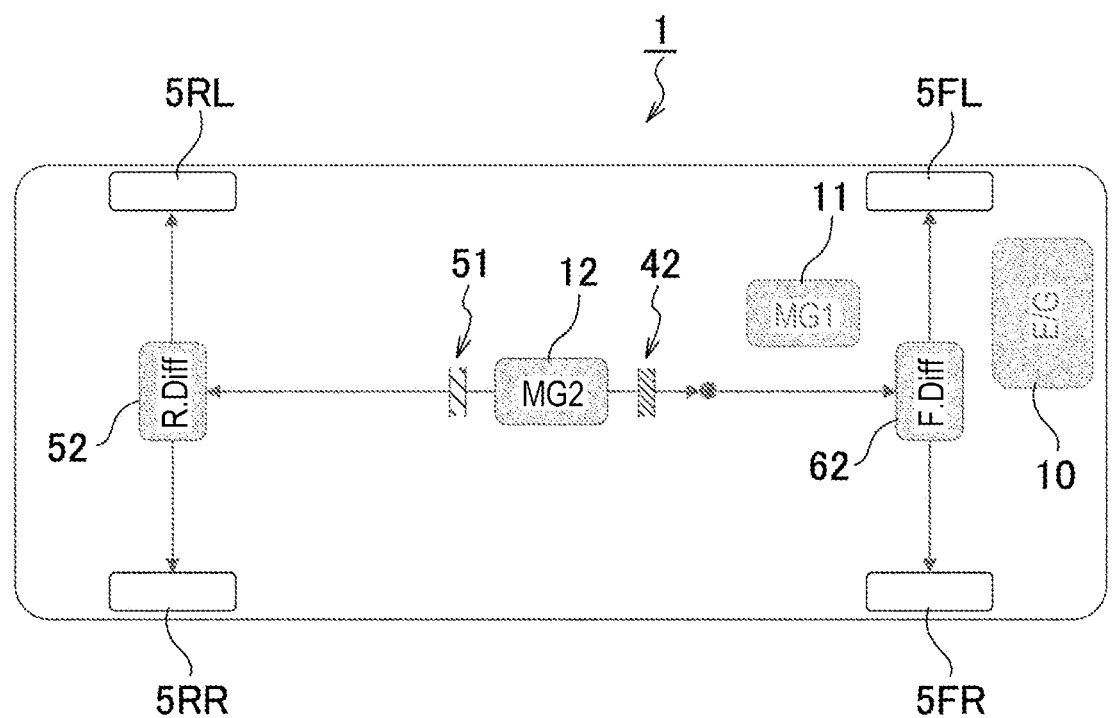
FIG. 4 is a diagram illustrating a torque transmission path (torque flow) in an EV traveling mode.
Figure 5:
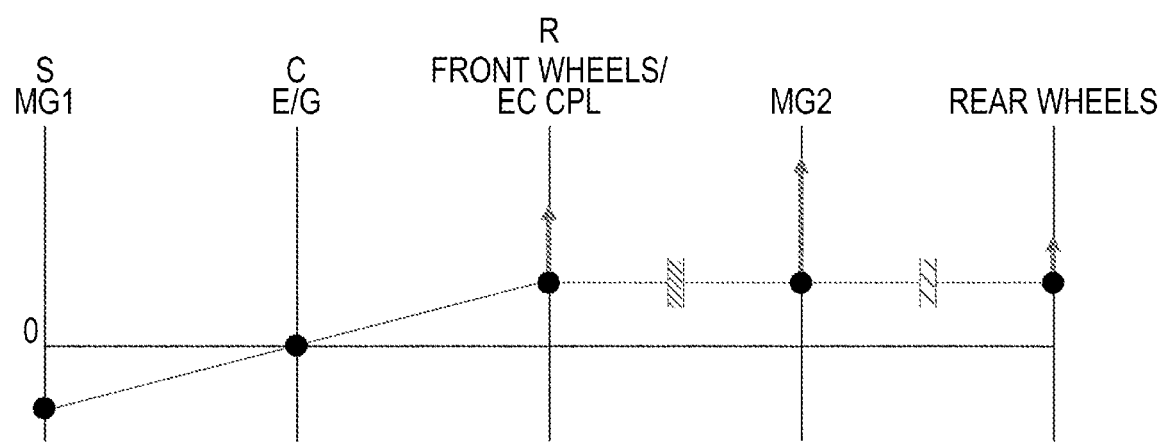
FIG. 5 is a collinear diagram (velocity diagram) illustrating rotational states (operational states) of the first motor generator, the engine, the front wheels, the second motor generator, and the rear wheels in the EV traveling mode.

A torque transmission path (torque flow) in the EV traveling mode is illustrated in FIG. 4. A collinear diagram (velocity diagram) illustrating rotational states (operational states) of the first motor generator 11, the engine 10, the front wheels 5FL and 5FR, the second motor generator 12, and the rear wheels 5RL and 5RR in the EV traveling mode is illustrated in FIG. 5.

In the EV traveling (motor traveling) mode, in which traveling is performed by the second motor generator 12 with the engine 10 being suspended (stopped), the torque of the second motor generator 12 is transmitted to the front wheels 5FL and 5FR via the first clutch 42 and transmitted to the rear wheels 5RL and 5RR via the second clutch 51. At this time, when the front-rear driving-force distribution ratio of the front wheels 5FL and 5FR is greater than or equal to that of the rear wheels 5RL and 5RR, the first clutch 42 is engaged, and the second clutch 51 is caused to be in a half clutch state. When the front-rear driving-force distribution ratio of the front wheels 5FL and 5FR is less than that of the rear wheels 5RL and 5RR, the second clutch 51 is engaged, and the first clutch 42 is caused to be in a half clutch state.

(3) Regeneration Mode

In the regeneration mode, the HEV-CU 80 engages the first clutch 42 and disengages the second clutch 51.

Figure 6:
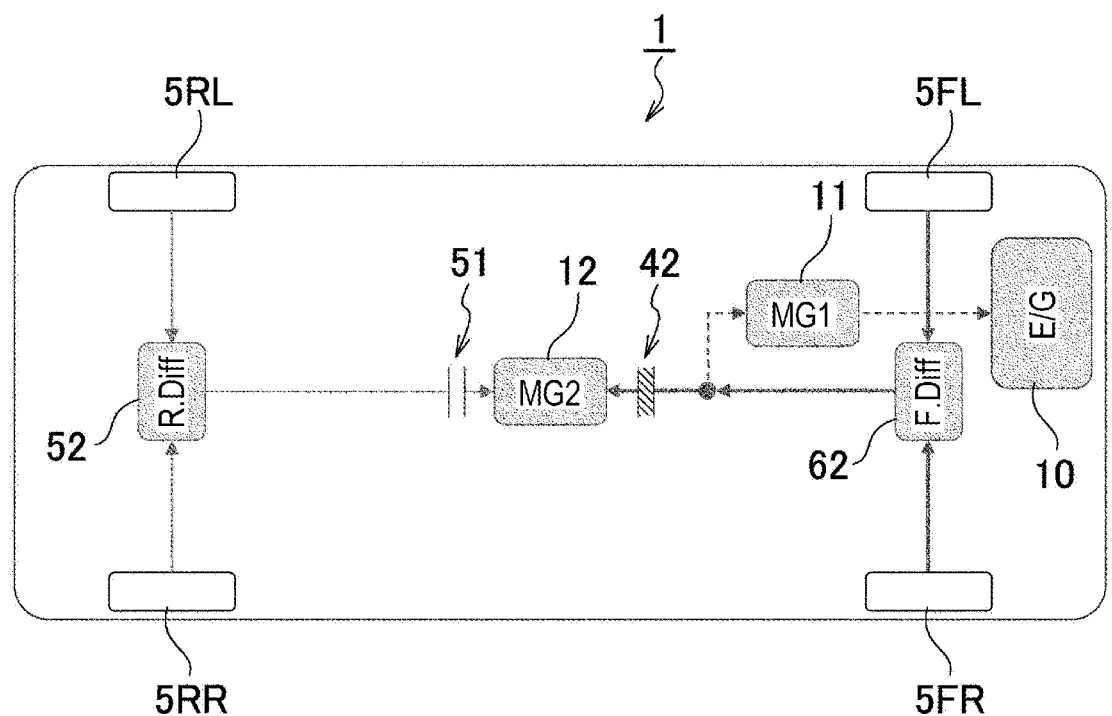
FIG. 6 is a diagram illustrating a torque transmission path (torque flow) in a regeneration mode.
Figure 7:
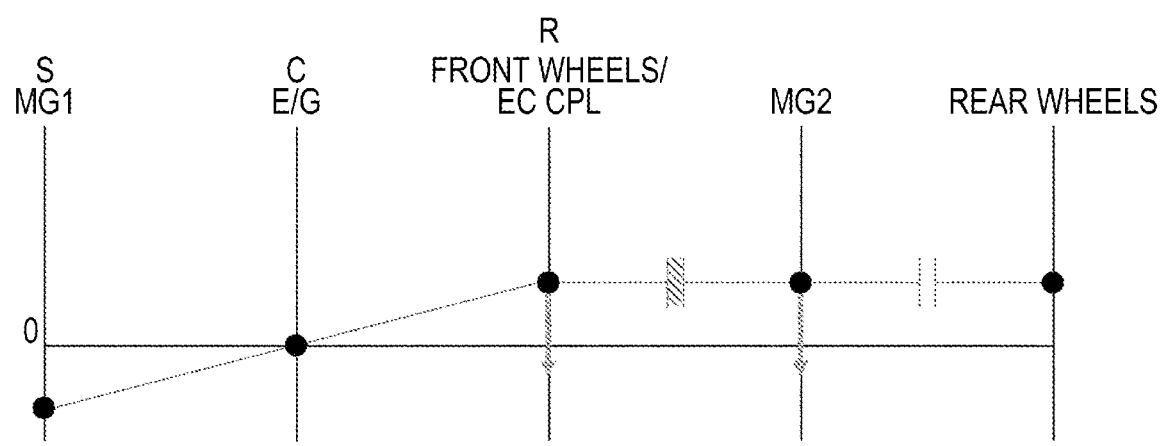
FIG. 7 is a collinear diagram (velocity diagram) illustrating rotational states (operational states) of the first motor generator, the engine, the front wheels, the second motor generator, and the rear wheels in the regeneration mode.

A torque transmission path (torque flow) in the regeneration mode is illustrated in FIG. 6. A collinear diagram (velocity diagram) illustrating rotational states (operational states) of the first motor generator 11, the engine 10, the front wheels 5FL and 5FR, the second motor generator 12, and the rear wheels 5RL and 5RR in the regeneration mode is illustrated in FIG. 7.

In the regeneration mode (during braking), the second clutch 51 is disengaged (or caused to be in a half clutch state), and the first clutch 42 is engaged. Thus, the second motor generator 12 and the front wheels 5FL and 5FR are directly coupled to each other, and regenerated energy may be desirably collected from the front wheels 5FL and 5FR. At this time, due to the second clutch 51 being disengaged, differential limiting torque may become approximately zero, which may avoid spin tendency of the vehicle. When both of the first clutch 42 and the second clutch 51 have transmission capacities during braking and differential limit of the rotation of the front and rear wheels is performed, cascade lock (all-wheel lock) may occur and cause the vehicle to spin.

(4) Switching from EV Traveling to HEV Traveling (Engine Restart)

When switching from the EV traveling (motor traveling) mode by the second motor generator 12 to the HEV traveling (hybrid traveling) mode by restarting the engine 10, the HEV-CU 80 restarts the engine 10 by operating (driving) the first motor generator 11 and also regulates (controls) the engagement forces of the first clutch 42 and the second clutch 51 and regulates the output torque of the second motor generator 12 to compensate the driving torque of the front wheels 5FL and 5FR by the second motor generator 12 while maintaining the driving torque of the rear wheels 5RL and 5RR.

Figure 8:
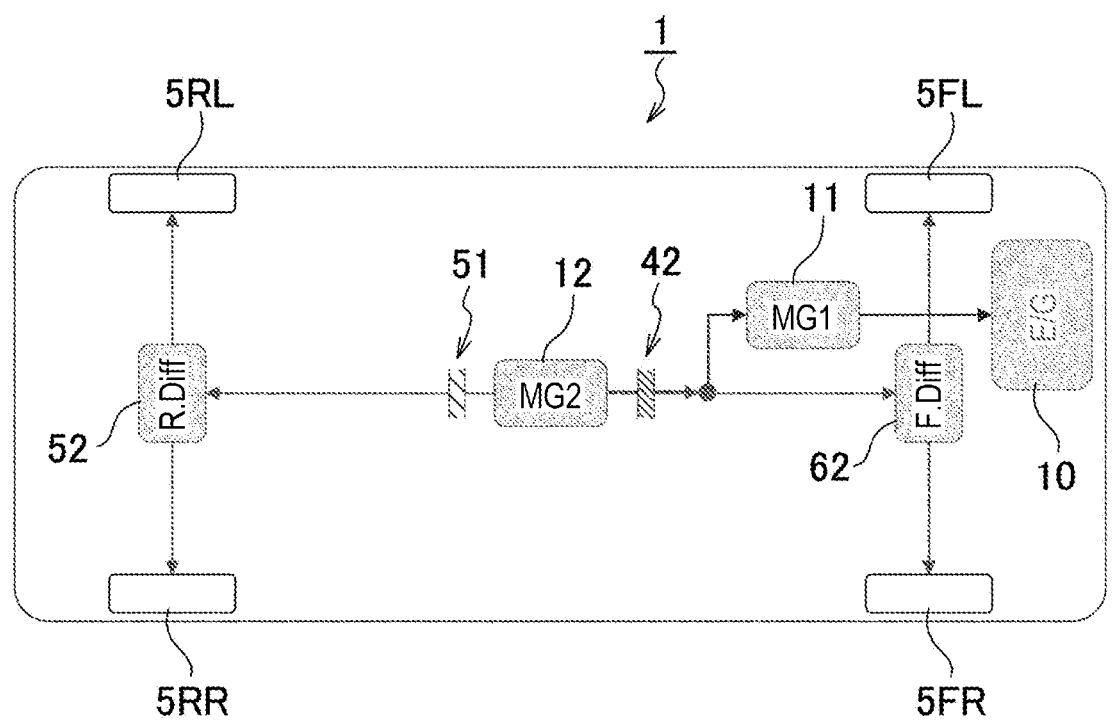
FIG. 8 is a diagram illustrating a torque transmission path (torque flow) during switching (during an engine restart) from the EV traveling mode to the HEV traveling mode.
Figure 9:
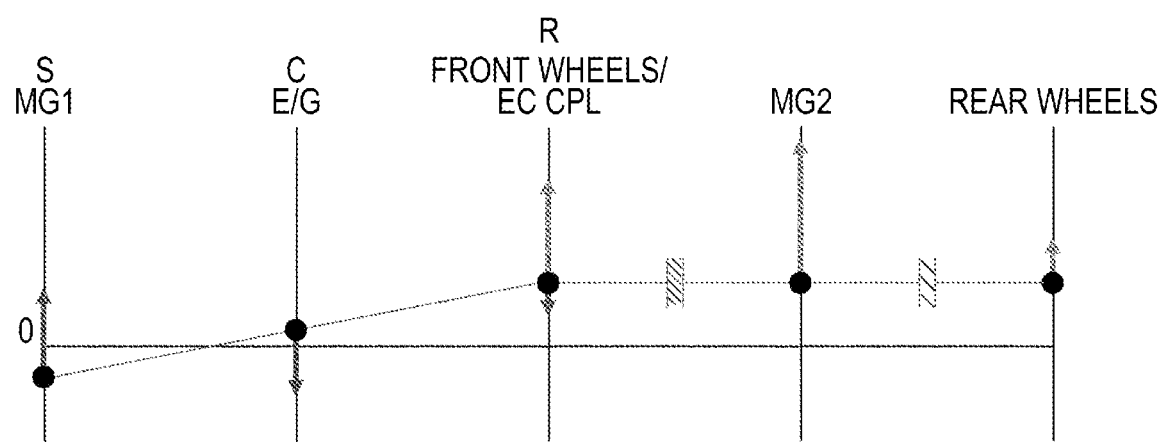
FIG. 9 is a collinear diagram (velocity diagram) illustrating rotational states (operational states) of the first motor generator, the engine, the front wheels, the second motor generator, and the rear wheels during switching (during an engine restart) from the EV traveling mode to the HEV traveling mode.

A torque transmission path (torque flow) during switching (during an engine restart) from the EV traveling mode to the HEV traveling mode is illustrated in FIG. 8. A collinear diagram (velocity diagram) illustrating rotational states of the first motor generator 11, the engine 10, the front wheels 5FL and 5FR, the second motor generator 12, and the rear wheels 5RL and 5RR during switching (during an engine restart) from the EV traveling mode to the HEV traveling mode is illustrated in FIG. 9.

During switching (during an engine restart) from the EV traveling mode to the HEV traveling mode, for example, the second clutch 51 is controlled to be in a half clutch state, and appropriate torque may be transmitted to the rear wheels 5RL and 5RR. Meanwhile, due to the first clutch 42 being engaged, the output torque of the second motor generator 12 is transmitted also to the front wheels 5FL and 5FR. Consequently, when the engine 10 is restarted by driving the first motor generator 11 to increase the rotation of the engine 10, a reactive force to be transmitted to the front wheels 5FL and 5FR is cancelled, and desirable front-rear driving-force distribution may be maintained.

As described above in detail, according to the present embodiment, the first clutch 42 is engaged while the second clutch 51 is disengaged during regeneration. Thus, the second motor generator 12 and the front wheels 5FL and 5FR are directly coupled to each other, and regenerated energy may be desirably collected from the front wheels 5FL and 5FR. At this time, due to the second clutch 51 being disengaged, differential limiting torque may become approximately zero, which may avoid spin tendency of the vehicle.

During shifting from the motor traveling (EV traveling) by the second motor generator 12 to the hybrid traveling (HEV traveling) by restarting the engine 10, the engine 10 is restarted by operating (driving) the first motor generator 11. Meanwhile, the engagement forces of the first clutch 42 and the second clutch 51 are regulated (controlled) and the output torque of the second motor generator 12 is regulated to compensate the driving torque of the front wheels 5FL and 5FR by the second motor generator 12 while maintaining the driving torque of the rear wheels 5RL and 5RR. Thus, for example, the output torque of the second motor generator 12 may be transmitted also to the front wheels 5FL and 5FR by engaging the first clutch 42 while transmitting appropriate torque to the rear wheels 5RL and 5RR by controlling the second clutch 51 to be in a half clutch state. Consequently, when the engine 10 is restarted by driving the first motor generator 11 and increasing the rotation of the engine 10, a reactive force that acts on the front wheels 5FL and 5FR may be cancelled while desirable front-rear driving-force distribution is maintained.

As a result, the two-motor hybrid all-wheel-drive vehicle 1 including the engine 10 and the two motor generators 11 and 12 may be able to perform regeneration with the front wheels 5FL and 5FR during deceleration and able to achieve desirable front-rear driving-force distribution when shifting from the EV traveling (motor traveling) by the second motor generator 12 to the HEV traveling (hybrid traveling) by the engine 10 and the second motor generator 12 by starting the engine 10.

According to the present embodiment, in the HEV traveling (hybrid traveling) mode, the engine 10, the first motor generator 11, and the second motor generator 12 are operated (driven). Meanwhile, the engagement forces of the first clutch 42 and the second clutch 51 are regulated (controlled) to achieve front-rear driving-force distribution in accordance with a margin of the frictional force of each of the front wheels 5FL and 5FR and the rear wheels 5RL and 5RR with respect to a road surface. Thus, during the HEV traveling, in which the all wheels are driven, desirable front-rear driving-force distribution in accordance with a margin of the frictional force of each of the front wheels 5FL and 5FR and the rear wheels 5RL and 5RR with respect to a road surface may be achieved.

Further, according to the present embodiment, in the EV traveling (motor traveling) mode, the engine 10 and the first motor generator 11 are suspended (stopped), and the second motor generator 12 is operated (driven). Meanwhile, the engagement forces of the first clutch 42 and the second clutch 51 are regulated (controlled) to achieve front-rear driving-force distribution in accordance with a margin of the frictional force of each of the front wheels 5FL and 5FR and the rear wheels 5RL and 5RR with respect to a road surface. Thus, during the EV traveling, in which the all wheels are driven, desirable front-rear driving-force distribution in accordance with a margin of the frictional force of each of the front wheels 5FL and 5FR and the rear wheels 5RL and 5RR with respect to a road surface may be achieved.

According to the present embodiment, the vertical loads of the front wheels 5FL and 5FR and the rear wheels 5RL and 5RR are obtained from the front-rear acceleration and the lateral acceleration of the vehicle. On the basis of the vertical loads, a margin of a frictional force with respect to a road surface is estimated. Therefore, a margin of the frictional force of each of the front wheels 5FL and 5FR and the rear wheels 5RL and 5RR with respect to a road surface may be desirably estimated. Moreover, control may be performed to achieve desirable front-rear driving-force distribution in accordance with the margin of the frictional force with respect to the road surface.

An embodiment of the disclosure has been described above. The disclosure is, however, not limited to the aforementioned embodiment and can be variously modified. For example, the configuration of the driving system including the plurality of gears and shafts is not limited to that in the aforementioned embodiment. In the aforementioned embodiment, the first clutch 42 and the second clutch 51 of a hydraulic type are used; however, the first clutch 42 and the second clutch 51 of, for example, an electric type may be also usable.

System configurations of controllers including the HEV-CU 80, the ECU 81, and the like, division of functions of the controllers, and the like are not limited to those in the aforementioned embodiment.

The HEV-CU 80 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the HEV-CU 80. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A hybrid all-wheel-drive vehicle comprising:
an engine;
a first motor generator;
a second motor generator;

a first clutch interposed between the second motor generator and a front wheel of the hybrid all-wheel-drive vehicle in a torque transmitting path;

a second clutch interposed between the second motor generator and a rear wheel of the hybrid all-wheel-drive vehicle in the torque transmitting path;

a control unit that is configured to control, based on a traveling state of the vehicle, the engine, the first motor generator, the second motor generator, the first clutch, and the second clutch; and a first planetary gear mechanism interposed between the first motor generator and the second motor generator in the torque transmitting path, the first planetary gear mechanism including a sun gear to which a rotary shaft of the first motor generator is coupled in a manner configured to transmitting torque and a carrier to which an output shaft of the engine is coupled in a manner configured to transmitting torque, wherein the first motor generator is coupled to the engine in a manner configured to transmitting torque and is coupled to the front wheel in a manner configured to transmitting torque, wherein the control unit is configured to:
during regeneration, engage the first clutch and disengage the second clutch to cause the second motor generator to function as an generator;
when the hybrid all-wheel-drive vehicle shifts from motor traveling by the second motor generator to hybrid traveling by restarting the engine, restart the engine by operating the first motor generator, and regulate an engagement force of each of the first clutch and the second clutch and regulate output torque of the second motor generator to compensate driving torque of the front wheel by the second motor generator while maintaining driving torque of the rear wheel; and
when the hybrid all-wheel-drive vehicle shifts from the motor traveling by the second motor generator to the hybrid traveling by restarting the engine by driving the first motor generator, control engagement forces of the first clutch and the second clutch and an output torque of the second motor generator so as to compensate a driving torque of the front wheel by the second motor generator while maintaining a driving torque of the rear wheel by the second motor generator, wherein the driving torque of the front wheel is compensated by the control unit by cancelling a reactive force that acts on the front wheel, and wherein the reactive force is a force that is generated by driving the first motor generator to restart the engine and that generates a decelerating force in the front wheel and the rear wheel.

2. The hybrid all-wheel-drive vehicle according to claim 1,
wherein the control unit is configured to, during the hybrid traveling, operate the engine, the first motor generator, and the second motor generator, and regulate the engagement force of each of the first clutch and the second clutch to achieve front-rear driving-force distribution in accordance with a margin of a frictional force of each of the front wheel and the rear wheel with respect to a road surface.

3. The hybrid all-wheel-drive vehicle according to claim 1,
wherein the control unit is configured to, during the motor traveling, suspend the engine and the first motor generator, operate the second motor generator, and regulate the engagement force of each of the first clutch and the second clutch to achieve front-rear driving-force distribution in accordance with a margin of a frictional force of each of the front wheel and the rear wheel with respect to a road surface.

4. The hybrid all-wheel-drive vehicle according to claim 2,
wherein the control unit is configured to, during the motor traveling, suspend the engine and the first motor generator, operate the second motor generator, and regulate the engagement force of each of the first clutch and the second clutch to achieve the front-rear driving-force distribution in accordance with the margin of the frictional force of each of the front wheel and the rear wheel with respect to the road surface.

5. The hybrid all-wheel-drive vehicle according to claim 2,
wherein the control unit is configured to obtain a vertical load of each of the front wheel and the rear wheel from front-rear acceleration and lateral acceleration of the vehicle and, based on the vertical load, estimate the margin of the frictional force with respect to the road surface.

6. The hybrid all-wheel-drive vehicle according to claim 3,
wherein the control unit is configured to obtain a vertical load of each of the front wheel and the rear wheel from front-rear acceleration and lateral acceleration of the vehicle and, based on the vertical load, estimate the margin of the frictional force with respect to the road surface.

7. The hybrid all-wheel-drive vehicle according to claim 4,
wherein the control unit is configured to obtain a vertical load of each of the front wheel and the rear wheel from front-rear acceleration and lateral acceleration of the vehicle and, based on the vertical load, estimate the margin of the frictional force with respect to the road surface.

8. The hybrid all-wheel-drive vehicle according to claim 1, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque.

9. The hybrid all-wheel-drive vehicle according to claim 2, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

10. The hybrid all-wheel-drive vehicle according to claim 3, further comprising
a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

11. The hybrid all-wheel-drive vehicle according to claim 4, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

12. The hybrid all-wheel-drive vehicle according to claim 5, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

13. The hybrid all-wheel-drive vehicle according to claim 6, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

14. The hybrid all-wheel-drive vehicle according to claim 7, further comprising a second planetary gear mechanism that includes a sun gear to which a rotary shaft of the second motor generator is coupled in a manner capable of transmitting torque and a carrier to which the first clutch and the second clutch are coupled in a manner capable of transmitting torque, and that is interposed between the first motor generator and the second motor generator in the torque transmitting path.

15. A hybrid all-wheel-drive vehicle comprising:
an engine;
a first motor generator;
a second motor generator;
a first clutch interposed between the second motor generator and a front wheel of the hybrid all-wheel-drive vehicle in a torque transmitting path;
a second clutch interposed between the second motor generator and a rear wheel of the hybrid all-wheel-drive vehicle in the torque transmitting path;
circuitry configured to control, based on a traveling state of the vehicle, the engine, the first motor generator, the second motor generator, the first clutch, and the second clutch; and
a first planetary gear mechanism interposed between the first motor generator and the second motor generator in the torque transmitting path, the first planetary gear mechanism including a sun gear to which a rotary shaft of the first motor generator is coupled in a manner configured to transmitting torque and a carrier to which an output shaft of the engine is coupled in a manner configured to transmitting torque,
wherein the first motor generator is coupled to the engine in a manner configured to transmitting torque and is coupled to the front wheel in a manner configured to transmitting torque,
wherein the circuitry is configured to:
during regeneration, engage the first clutch and disengage the second clutch to cause the second motor generator to function as an generator;
when the hybrid all-wheel-drive vehicle shifts from motor traveling by the second motor generator to hybrid traveling by restarting the engine, restart the engine by operating the first motor generator and regulate an engagement force of each of the first clutch and the second clutch and regulate output torque of the second motor generator to compensate driving torque of the front wheel by the second motor generator while maintaining driving torque of the rear wheel, and
when the hybrid all-wheel-drive vehicle shifts from the motor traveling by the second motor generator to the hybrid traveling by restarting the engine by driving the first motor generator, control engagement forces of the first clutch and the second clutch and an output torque of the second motor generator so as to compensate a driving torque of the front wheel by the second motor generator while maintaining a driving torque of the rear wheel by the second motor generator,
wherein the driving torque of the front wheel is compensated by the control unit by cancelling a reactive force that acts on the front wheel, and
wherein the reactive force is a force that is generated by driving the first motor generator to restart the engine and that generates a decelerating force in the front wheel and the rear wheel.

16. The hybrid all-wheel-drive vehicle according to claim 1,
wherein the control unit is configured to, during the regeneration, engage the first clutch and disengage the second clutch to cause the second motor generator to function as the generator for collecting regenerated energy from the front wheel.

17. The hybrid all-wheel-drive vehicle according to claim 1, wherein the control unit is configured to, when the hybrid all-wheel-drive vehicle shifts from the motor traveling by the second motor generator to the hybrid traveling by restarting the engine by driving the first motor generator, control the second clutch to be in a state to transmit at least a part of an output torque of the second generator to the rear wheel, and control the first clutch to be engaged to transmit another part of the output torque of the second motor generator to the front wheel, and
wherein the driving torque of the front wheel is compensated by the control unit by cancelling a reactive force that acts on the front wheel.

18. The hybrid all-wheel-drive vehicle according to claim 1,
wherein the control unit is configured to, when the hybrid all-wheel-drive vehicle shifts from the motor traveling by the second motor generator to the hybrid traveling by restarting the engine by driving the first motor generator, control the second clutch to be in a half clutch state to transmit a part of an output torque of the second generator to the rear wheel, and control the first clutch to be engaged to transmit another part of the output torque of the second motor generator to the front wheel.

19. The hybrid all-wheel-drive vehicle according to claim 18,
wherein the control unit is configured to, when the hybrid all-wheel-drive vehicle shifts from the motor traveling by the second motor generator to the hybrid traveling by restarting the engine by driving the first motor generator, control engagement forces of the first clutch and the second clutch and an output torque of the second motor generator so as to compensate a driving torque of the front wheel by the second motor generator while maintaining a driving torque of the rear wheel, wherein the driving torque of the front wheel is compensated by the control unit by cancelling a reactive force that acts on the front wheel, and wherein the reactive force is a force that is generated by driving the first motor generator to restart the engine and that generates a decelerating force in the front wheel and the rear wheel.

\* \* \* \* \*